United States Patent
Raftis et al.

(10) Patent No.: US 6,367,505 B1
(45) Date of Patent: Apr. 9, 2002

(54) CHECK VALVE WITH OVERSIZED BILL

(75) Inventors: Spiros G. Raftis, Pittsburgh; Andre T. Abromaitis, Sewickley; Michael J. Duer, Zelienople, all of PA (US)

(73) Assignee: Red Valve Co., Inc., Carnegie, PA (US)

( * ) Notice: Subject to any disclaimer, the term of this patent is extended or adjusted under 35 U.S.C. 154(b) by 0 days.

(21) Appl. No.: 09/533,298

(22) Filed: Mar. 22, 2000

(51) Int. Cl.$^7$ ............................................. F16K 15/16
(52) U.S. Cl. ........................ 137/846; 137/847; 137/850
(58) Field of Search ................................. 137/850, 844, 137/846, 847

(56) References Cited

U.S. PATENT DOCUMENTS

| 4,585,031 A | * | 4/1986 | Raftis et al. ................. 137/846 |
| 4,607,663 A | * | 8/1986 | Raftis et al. ................. 137/846 |
| 5,606,995 A | * | 3/1997 | Raftis .......................... 137/846 |
| 5,727,593 A |   | 3/1998 | Duer ............................ 137/846 |
| 5,931,197 A |   | 8/1999 | Raftis et al. ................. 137/847 |

\* cited by examiner

Primary Examiner—Michael Powell Buiz
Assistant Examiner—Ramesh Krishnamurthy
(74) Attorney, Agent, or Firm—Webb Ziesenheim Logsdon Orkin & Hanson, P.C.

(57) ABSTRACT

A check valve having an upstream inlet part mountable on a discharge end of a conduit, a downstream outlet part adapted to prevent backflow of fluid through the check valve, and a transition part located between the upstream inlet part and the downstream outlet part. A longitudinal dimension of the downstream outlet part extending in a direction transverse to a direction of flow is at least approximately 1.57 times the diameter of the upstream inlet part.

25 Claims, 3 Drawing Sheets

(a)          (b)          (c)

(a)          (b)

(a)

(b)          (c)

CHECK VALVE WITH OVERSIZED BILL

BACKGROUND OF THE INVENTION

1. Field of the Invention

The present invention relates to a check valve of the so-called "duckbill" type for use in drainage systems and effluent outfall lines.

2. Description of the Prior Art

A check valve is essentially a valve which allows fluid to flow in only one direction through a conduit, while closing and preventing back or reverse flow, when back pressure builds up downstream of the valve to a level greater than the upstream fluid pressure head. Check valves are used in various fluid transportation operations and must include some means of allowing the forward flow of liquid yet preventing any backflow.

Conventional rubber duckbill check valves have an inlet cuff, an outlet bill and a transitional middle part for connecting the cuff and the bill. The bill comprises a slit which opens when fluid is forced through the valve. Typically, existing "duckbill" type check valves have a bill slit dimension that is equal to or less than one-half the cuff (inlet) circumference. The reason for this is that if the bill slit dimension is larger than one-half the circumference of the cuff diameter, it becomes difficult or even impossible to remove a one-piece mandrel, which is used to manufacture the check valve through the cuff.

In most applications, it is desirable to have the maximum flow through the valve at the lowest possible pressure drop in the forward direction of the flow or, in other words, the lowest possible headloss. To improve the performance of duckbill check valves, valves have been recently developed in which the width of the bill is larger than the diameter of the cuff. The output area and the open position of the bill thus approaches more of the inlet area of the cuff, and the headloss decreases. For example, U.S. Pat. No. 5,931,197 to Raftis et al. discloses an asymmetrical check valve of this type.

It is therefore an object of the present invention to provide a duckbill check valve with an improved headloss over conventional valves. It is another object of the present invention to provide a check valve that overcomes the design problems encountered in the prior art.

SUMMARY OF THE INVENTION

The present invention is a check valve with an oversized bill. The present invention includes a tubular inlet part, an outlet part and a transitional middle part, connecting the inlet part with the outlet part, wherein the width or height of the outlet part is at least approximately 1.57 times the diameter of the inlet part. The outlet part may be symmetrical about a longitudinal plane through the check valve. It can also have a curved bill.

The advantage of a valve of this size is the low headloss compared to conventional duckbill check valves.

With an effective outlet area larger than the inlet area of the valve, the headloss will drop below the headloss of an open pipe end at high flow rates.

The invention itself, both as to its construction and its method of operation, together with the additional objects and advantages thereof, will best be understood from the following description of specific embodiments when read in connection with the accompanying drawings.

DETAILED DESCRIPTION OF THE PREFERRED EMBODIMENT

Figure 1:
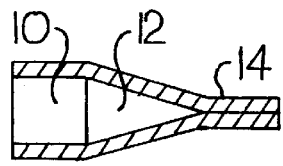
FIG. 1a shows a top view of a conventional duckbill check valve according to the prior art.
FIG. 1b shows a side view of the conventional duckbill check valve of FIG. 1a according to the prior art.
FIG. 1c shows a front view of the conventional duckbill check valve of FIG. 1a according to the prior art.
Figure 1:
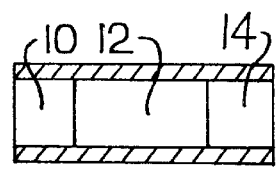
Figure 1:
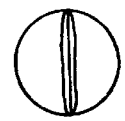
Figure 2:
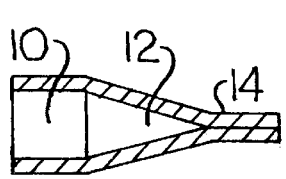
FIG. 2a shows a top view of another conventional duckbill check valve according to the prior art.
FIG. 2b shows a side view of the conventional duckbill check valve of FIG. 2a according to the prior art.
Figure 2:
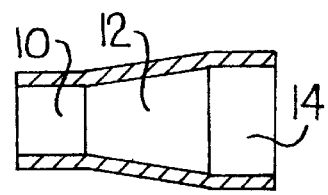

FIGS. 1 and 2 both show conventional duckbill check valves. These valves comprise an inlet portion 10, a transitional portion 12 and an outlet portion 14. The advantages of these designs are the low tooling costs and simple removal of a mandrel from the completed part. The check valve shown in FIG. 2 is slightly widening, with the width of the outlet portion 14 approximately equal to one-half the circumference of the inlet portion 10. The mandrel is slightly more difficult to remove from the completed valve, but the headloss is lower.

After extensive testing at the Water Research Laboratories of Utah State University, it was determined that for submerged discharge, the headloss of a "duckbill" type of check valve is very closely equal to:

$$H = Q^2 / 19.5 g A^2$$

where H=Headloss in feet of water,
Q=Quantity of water flowing in gallons per minute,
g=Gravitational constant=32.16 feet/sec$^2$, and
A=Effective open area in square inches.

Therefore, for constant flow conditions, the headloss is inversely proportional to the discharge area squared.

Figure 3:
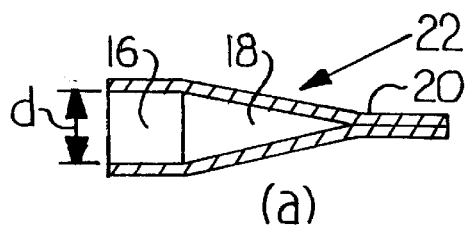
FIG. 3a shows a top view of an embodiment according to the present invention.
FIG. 3b shows a side view of the embodiment of FIG. 3a according to the present invention.
FIG. 3c shows a front view of the embodiment of FIG. 3a according to the present invention.
Figure 3:
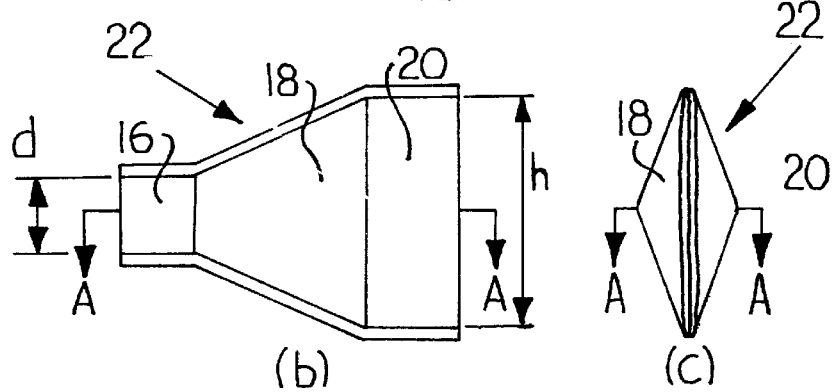

It was found that with a width or height (depending upon orientation) of the outlet portion 14 at least approximately 1.57 times the diameter of the inlet part, the headloss is much smaller than the headloss of conventional check valves. The present invention is a duckbill check valve 22 with an enlarged bill, as shown in FIG. 3. the duckbill check valve 22 comprises an inlet part 16, a transitional part 18 and an outlet part 20, which appears as a pair of lips facing and engaging one another. The height h of the outlet part 20 (or bill) of FIG. 3 is substantially larger than the diameter d of the inlet part 16. In fact, the height of the outlet part 20, in its closed position, should be at least approximately 1.57 times the diameter d of the inlet part 16.

It is important to note that the outlet part 20 may be oriented in different positions, rotatable about an axis perpendicular to the pipeline 30. FIG. 3 shows the outlet part 20 of the present invention wherein the outlet part 20 (or lips) is oriented in a vertical manner, making the height h the operative dimension. Turning to FIGS. 4–7, the outlet part 20 is oriented in a horizontal manner, making the width w the operative dimension. According to the invention, it is the longitudinal dimension of the outlet part, in its closed position, that must be substantially larger than the diameter d of the inlet part 16.

Figure 4:
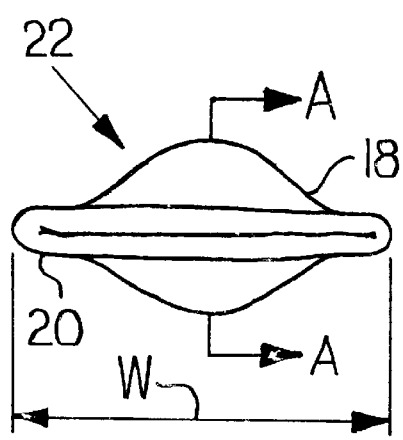
FIG. 4 shows a front view of the present invention in a closed position.
Figure 5:
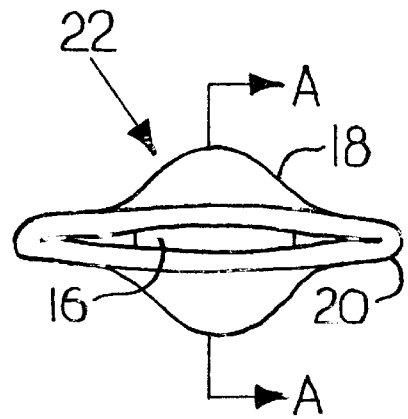
FIG. 5 shows a front view of the present invention in a slightly opened position.
Figure 6:
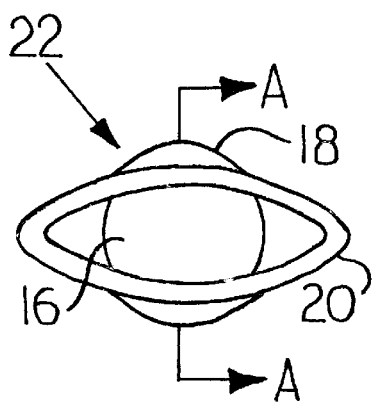
FIG. 6 shows a front view of the present invention in a further opened position.
Figure 7:
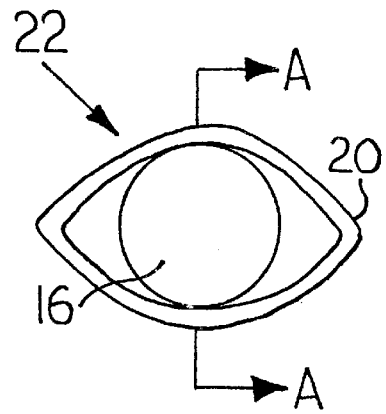
FIG. 7 shows a front view of the present invention in a fully opened position.
Figure 8:
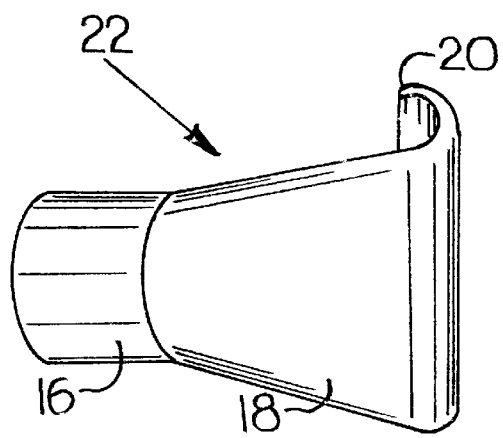
FIG. 8 shows a perspective view of the present invention with a curvilinear-shaped outlet part.
Figure 9:
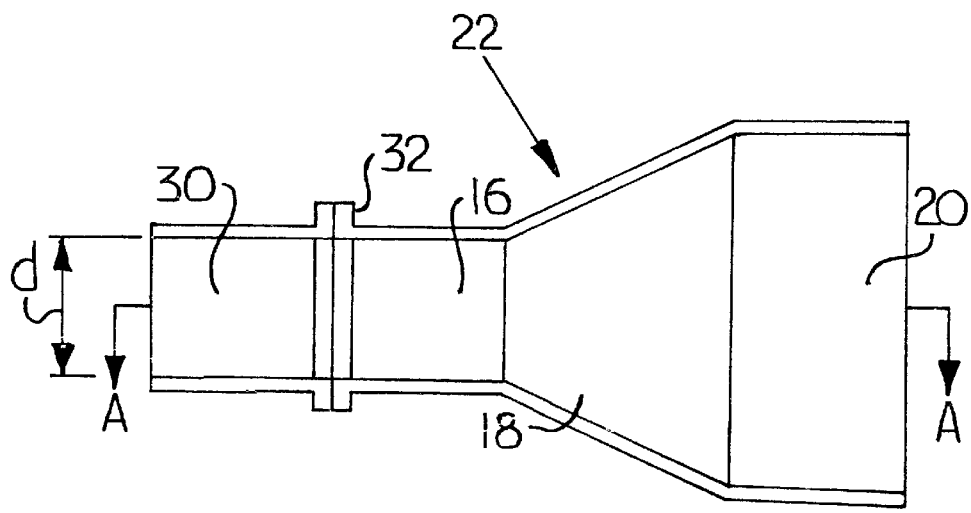
FIG. 9 shows a side sectional view of the present invention attached to a pipeline via a flange.

FIGS. 4–7 show the different opening stages of a duckbill check valve 22 according to the present invention. FIG. 4 shows a closed duckbill check valve 22, FIGS. 5 and 6 show a progressively open duckbill check valve 22 and FIG. 7 shows a fully open duckbill check valve 22. As can be seen from FIG. 7, depending on valve stiffness, the outlet part 20 will not open to a full circular opening, but will open to approximately 40% to 85% of the area of a full circular opening.

Valves built in accordance with the present invention, with an outlet part 20 bill slit greater than 1.57 times the inlet part 16 bore diameter, will have an open area about equal to, or larger than, the area of the inlet part 16. Thus, the headloss is considerably lower than the headloss of conventional valves. Again, it is the width w of the outlet part 20 (in FIGS. 4–8) that should be at least approximately 1.57 times the diameter d of the inlet part.

The duckbill check valve 22 is preferably made from an elastomer, such as neoprene, or an elastomer reinforced with synthetic fabric, such as nylon or polyester, with construction similar to an automobile tire. The inlet part 16 is generally made of a stiff, durable material, such as styrene butadiene, with polyester fabric reinforcing, whereas the outlet part 20 is made of a flexible material to allow proper opening and closing of the outlet part 20. Further, the outlet part 20 may be symmetrical about a longitudinal plane A—A through the duckbill check valve 22. This longitudinal plane A—A is coincident with a center line of the inlet part 16. In addition, it is also envisioned that the outlet part 20 may be curvilinear, as described in U.S. Pat. No. 5,727,593. The inlet part 16 may be fitted with a flange 32, instead of the cuff shown in the drawings.

A duckbill check valve according to the preferred embodiment is manufactured similarly to a tire, using a multiple-piece mandrel. The mandrel will have to be disassembled to remove it from the inside of the valve. However, the great reduction in headloss will justify the added expense of manufacturing the invention. Furthermore, the duckbill check valve 22 can be provided with local reinforcements, such as embedded wire, plates, rings and tubes.

It will be understood by those of ordinary skill in the art that modifications may be made without departing from the spirit and scope of the present invention.

We claim:

1. A check valve, comprising:
   an upstream inlet part mountable on a discharge end of a conduit;
   a downstream outlet part adapted to prevent backflow of fluid through the check valve; a transition part located between the upstream inlet part and the downstream outlet part;
   a longitudinal dimension of the downstream outlet pat extending in a direction transverse to a direction of flow being greater than approximately 1.57 times the diameter of the upstream inlet part;
   and wherein the downstream outlet part is symmetrical about a horizontal longitudinal plane though the downstream outlet part, the longitudinal plane coincident with the center line of the upstream inlet part.

2. The check valve of claim 1, further comprising a flange on the upstream inlet part.

3. The check valve of claim 1, wherein the check valve is made at least in part from an elastomeric material.

4. The check valve of claim 3, further comprising a synthetic reinforcement in the elastomeric material.

5. The check valve of claim 1, wherein the upstream inlet part is made at least in part from a stiff, durable material.

6. The check valve of claim 1, wherein the upstream inlet part further includes a polyester fabric reinforcement.

7. The check valve of claim 1, further including local reinforcements selected from the group consisting of embedded wire, plates, rings, and tubes.

8. The check valve of claim 1, wherein, in operation, the downstream outlet part will open to approximately 40% to 85% of the area of a full circular opening.

9. A check valve, comprising:
   an upstream inlet part mountable on a discharge end of a conduit;
   a downstream outlet part adapted to prevent backflow of fluid through the check valve;
   a transition part located between the upstream inlet part and the downstream outlet part;
   a longitudinal dimension of the downstream outlet part extending in a direction transverse to a direction of flow being greater than approximately 1.57 times the diameter of the upstream inlet part; and
   wherein the downstream outlet part is symmetrical about a vertical longitudinal plane through the downstream outlet part, the longitudinal plane coincident with the center line of the upstream inlet part.

10. The check valve of claim 9, further comprising a flange on the upstream inlet part.

11. The check valve of claim 9, wherein the check valve is made at least in part from an elastomeric material.

12. The check valve of claim 11, further comprising a synthetic reinforcement in the elastomeric material.

13. The check valve of claim 9, wherein the upstream inlet part is made at least in part from a stiff, durable material.

14. The check valve of claim 9, wherein the upstream inlet part further includes a polyester fabric reinforcement.

15. The check valve of claim 9, further including local reinforcements selected from the group consisting of embedded wire, plates, rings, and tubes.

16. The check valve of claim 9, wherein, in operation, the downstream outlet part will open to approximately 40% to 85% of the area of a full circular opening.

17. A check valve, comprising:
   an upstream inlet part mountable on a discharge end of a conduit;
   a downstream outlet part adapted to prevent backflow of fluid through the check valve;
   a transition part located between the upstream inlet part and the downstream outlet part;
   a longitudinal dimension of the downstream outlet part extending in a direction transverse to a direction of flow being greater than approximately 1.57 times the diameter of the upstream inlet part; and
   wherein the downstream outlet part is performed to define a clear bill.

18. The check valve of claim 17, further comprising a flange on the upstream inlet part.

19. The check valve of claim 17, wherein the check valve is made at least in part from an elastomeric material.

20. The check valve of claim 19, further comprising a synthetic reinforcement in the elastomeric material.

21. The check valve of claim 17, wherein the upstream inlet part is made at least in part from a stiff, durable material.

22. The check valve of claim 17, wherein the upstream inlet part further includes a polyester fabric reinforcement.

23. The check valve of claim 17, further including local reinforcements selected from the group consisting of embedded wire, plates, rings, and tubes.

24. The check valve of claim 17, wherein, in operation, the downstream outlet part will open to approximately 40% to 85% of the area of a full circular opening.

25. A method for reducing headloss in conduit in a drainage system, including the steps of:

providing a check valve comprising an upstream inlet part mountable on a discharge end of the conduit, a downstream outlet part adapted to prevent backflow of a fluid through the check valve, a transition part located between the upstream inlet part and the downstream outlet part, and a longitudinal dimension of the downstream outlet part extending in a direction transverse to a direction of flow being greater than approximately 1.57 times the diameter of the upstream inlet part; and directing fluid through the conduit, in the inlet part, through the transition part, and out the downstream outlet part.

\* \* \* \* \*

UNITED STATES PATENT AND TRADEMARK OFFICE
CERTIFICATE OF CORRECTION

PATENT NO. : 6,367,505 B1
DATED : April 9, 2002
INVENTOR(S) : Raftis et al.

It is certified that error appears in the above-identified patent and that said Letters Patent is hereby corrected as shown below:

Column 2,
Line 22, after "position;" delete -- and --.

Column 3,
Line 62, "pat" should read -- part --.

Column 4,
Line 62, "performed" should read -- pre-formed --.

Signed and Sealed this

Third Day of June, 2003

JAMES E. ROGAN
*Director of the United States Patent and Trademark Office*